United States Patent
Lynar et al.

(10) Patent No.: US 9,104,412 B2
(45) Date of Patent: *Aug. 11, 2015

(54) MOBILE DEVICE OFFLOADING ITS TASK TO A PEER DEVICE WHEN AVAILABLE POWER IS BELOW A THRESHOLD LEVEL

(71) Applicant: International Business Machines Corporation, Armonk, NY (US)

(72) Inventors: Timothy M. Lynar, Kew (AU); Kent C. B. Steer, Brunswick (AU); Cristian Vecchiola, Southbank (AU); John M. Wagner, North Melbourne (AU)

(73) Assignee: International Business Machines Corporation, Armonk, NY (US)

( * ) Notice: Subject to any disclaimer, the term of this patent is extended or adjusted under 35 U.S.C. 154(b) by 178 days.

This patent is subject to a terminal disclaimer.

(21) Appl. No.: 13/730,274

(22) Filed: Dec. 28, 2012

(65) Prior Publication Data
US 2014/0189389 A1    Jul. 3, 2014

Related U.S. Application Data

(63) Continuation of application No. 13/730,081, filed on Dec. 28, 2012.

(51) Int. Cl.
*G06F 1/32* (2006.01)
*G06F 11/30* (2006.01)
*H04W 52/02* (2009.01)

(52) U.S. Cl.
CPC .............. *G06F 1/3203* (2013.01); *G06F 1/329* (2013.01); *G06F 1/3209* (2013.01); *G06F 11/3058* (2013.01); *H04W 52/0261* (2013.01); *H04W 52/0264* (2013.01); *Y02B 60/50* (2013.01)

(58) Field of Classification Search
CPC .. G06F 1/3203; G06F 2209/509; G06F 13/00
USPC .......................................................... 713/320
See application file for complete search history.

(56) References Cited

U.S. PATENT DOCUMENTS

| 6,529,748 | B1 * | 3/2003 | Bruner ......................... 455/574 |
| 8,112,475 | B2 | 2/2012 | Tran et al. |
| 2002/0184224 | A1 * | 12/2002 | Haff et al. ...................... 707/10 |
| 2005/0169219 | A1 * | 8/2005 | Serpa et al. ................... 370/338 |
| 2005/0216733 | A1 * | 9/2005 | Keohane et al. .............. 713/156 |

(Continued)

FOREIGN PATENT DOCUMENTS

WO    2011135352 A1    11/2011

*Primary Examiner* — Thomas Lee
*Assistant Examiner* — Santosh R Poudel
(74) *Attorney, Agent, or Firm* — Cantor Colburn LLP; Louis Percello (57) ABSTRACT

A system configured to manage battery energy of a mobile device includes a primary mobile device and at least one peer device. The primary mobile device includes a power unit, a main communication module to electrically communicate with a peer device, and a peer assisted module in electrical communication with the power unit and the main communication module. The peer assisted module determines an energy level of the energy unit, and determines a task to be executed by the peer device. The peer device receives the task transmitted from the primary mobile device. The peer device further includes a peer process management module that executes at least one computation that completes the task, and communicates a completed task to the primary mobile device.

21 Claims, 5 Drawing Sheets

(56) References Cited

U.S. PATENT DOCUMENTS

| | | | |
|---|---|---|---|
| 2005/0240466 A1* | 10/2005 | Duggirala | 705/10 |
| 2006/0095582 A1* | 5/2006 | Nitya et al. | 709/236 |
| 2007/0234077 A1* | 10/2007 | Rothman et al. | 713/300 |
| 2007/0277050 A1* | 11/2007 | Shankara et al. | 713/321 |
| 2008/0192666 A1* | 8/2008 | Koskan et al. | 370/311 |
| 2008/0212504 A1 | 9/2008 | Venkataraman et al. | |
| 2008/0276301 A1* | 11/2008 | Nataraj et al. | 726/3 |
| 2009/0125616 A1* | 5/2009 | Barsness et al. | 709/222 |
| 2009/0172082 A1* | 7/2009 | Sufuentes | 709/203 |
| 2009/0276482 A1* | 11/2009 | Rae et al. | 709/201 |
| 2010/0191994 A1* | 7/2010 | Nurminen et al. | |
| 2011/0154371 A1* | 6/2011 | Beale | 719/319 |
| 2011/0173305 A1* | 7/2011 | Matuszewski | 709/221 |
| 2011/0231469 A1* | 9/2011 | Wolman et al. | 709/201 |
| 2011/0289145 A1* | 11/2011 | Kim et al. | 709/204 |
| 2011/0289308 A1 | 11/2011 | Sobko et al. | |
| 2012/0023351 A1* | 1/2012 | Wakrat et al. | 713/322 |
| 2012/0054514 A1* | 3/2012 | Barsness et al. | 713/320 |
| 2012/0151051 A1* | 6/2012 | Zhang et al. | 709/224 |
| 2012/0230201 A1 | 9/2012 | Thota et al. | |
| 2013/0290755 A1* | 10/2013 | Wolman et al. | 713/320 |

* cited by examiner

MOBILE DEVICE OFFLOADING ITS TASK TO A PEER DEVICE WHEN AVAILABLE POWER IS BELOW A THRESHOLD LEVEL

CROSS-REFERENCE TO RELATED APPLICATION

This application is a continuation of U.S. patent application Ser. No. 13/730,081, filed Dec. 28, 2012, the disclosure of which is incorporated by reference herein in its entirety.

BACKGROUND

The present invention relates generally to mobile device power systems, and more specifically, to a system that manages battery energy in a mobile device.

As mobile devices continue to become a part of everyday life, an aspect of mobile devices is energy management. The performance of mobile devices has greatly improved over the years. Mobile devices are now capable of storing applications that perform complex computational tasks such as, for example, three-dimensional (3D) map generation, image recognition, and image/sound processing. However, as the complexity of the computations and tasks increase, the amount of energy required to carry out the computations and tasks also increases. For example, a geographical mapping application may include a feature of rendering a 3D map of a two-dimensional geographic location. The task of rendering the 3D map can require a large number of computations and the duration of the computations may be extensive. Consequently, many common tasks desired by users of today's mobile devices can rapidly consume the mobile device's available energy, i.e., drain the battery energy, in order to perform the necessary computations.

While there have been gradual improvements in battery technology, advancements to this date have not kept up with energy requirements of modern computational tasks. Further, the trend toward smaller, slimmer devices leads to little increase in capacity despite improvements in energy density.

SUMMARY

According to at least one embodiment, a system configured to manage battery energy of a mobile device comprises a primary mobile device and at least one peer device. The primary mobile device includes a power unit configured to power the primary mobile device. A primary process management module is configured to determine at least one application stored on the primary mobile device and to determine a task associated with the at least one application. A main communication module is configured to electrically communicate, i.e., transmit and/or receive data, with a peer device that is different from the primary mobile device. The primary mobile device further includes a peer assisted module in electrical communication with the power unit and the main communication module. The peer assisted module is configured to determine an energy level of the power unit, and to transmit the task from the primary mobile device via the main communication module. The at least one peer device includes a peer communication module configured to receive the task from the peer assisted module of the primary mobile device. The at least one peer device further includes a peer process management module in electrical communication with the peer communication module. The peer process management module is configured to execute at least one computation that completes the task and to communicate a completed task to the primary mobile device in response to completing the at least one computation.

In another embodiment, a primary mobile device to offload at least one task of a stored application to reduce energy consumption, the primary mobile device comprises a power unit configured to power the primary mobile device. A main communication module is configured to electrically communicate with a peer device that is different from the primary mobile device. The primary mobile device further includes a peer assisted module in electrical communication with the power unit and the main communication module. The peer assisted module is configured to determine an energy level of the power unit and to transmit the at least one task to the peer device in response to determining the energy level is below an energy threshold.

In another embodiment, a peer device to execute at least one task received from a primary mobile device comprises a peer communication module configured to electrically communicate with the primary mobile device. The peer device further includes a peer process management module configured to execute at least one computation to complete the at least one task. The peer process management module further transmits a completed task to the primary mobile device in response to completing the at least one computation.

In yet another embodiment, a method of extending battery life of a mobile device comprises detecting an execution of at least one software application stored on the mobile device. The method further includes determining a task of the software application. The task is completed in response to executing at least one computation. The method further includes determining a level of energy available to the mobile device, and transmitting the task from the primary mobile to a peer device. The method further includes executing that at least one computation via the peer device to generate a completed task, and transmitting the completed task from the peer device to the mobile device.

In another embodiment, a method of offloading at least one task of an application to reduce energy consumption of a mobile device comprises generating energy to operate the primary mobile device. The method further includes electrically communicating the primary mobile device with a peer device that is different from the primary mobile device. The method further includes determining a remaining amount of the energy, and transmitting the at least one task to the peer device in response to determining the remaining amount of energy is below an energy threshold.

In still another embodiment, a method of executing at least one task using a peer device to reduce power consumption of a primary mobile device comprises electrically communicating a peer device with the primary mobile device that is different from the peer device. The method further includes the peer device executing at least one computation to complete the at least one task. The method further includes transmitting a completed task from the peer device to the primary mobile device in response to completing the at least one computation Additional features are realized through the techniques of the present embodiments. Other embodiments of the invention are described in detail herein and are considered a part of the claims. For a better understanding of the embodiments and the features, refer to the description and to the drawings.

BRIEF DESCRIPTION OF THE SEVERAL VIEWS OF THE DRAWINGS

The subject matter described in by the various embodiments is particularly pointed out and distinctly claimed in the claims at the conclusion of the specification. The forgoing and other features of the various embodiments are apparent from the following detailed description taken in conjunction with the accompanying drawings in which:

DETAILED DESCRIPTION

Figure 1:
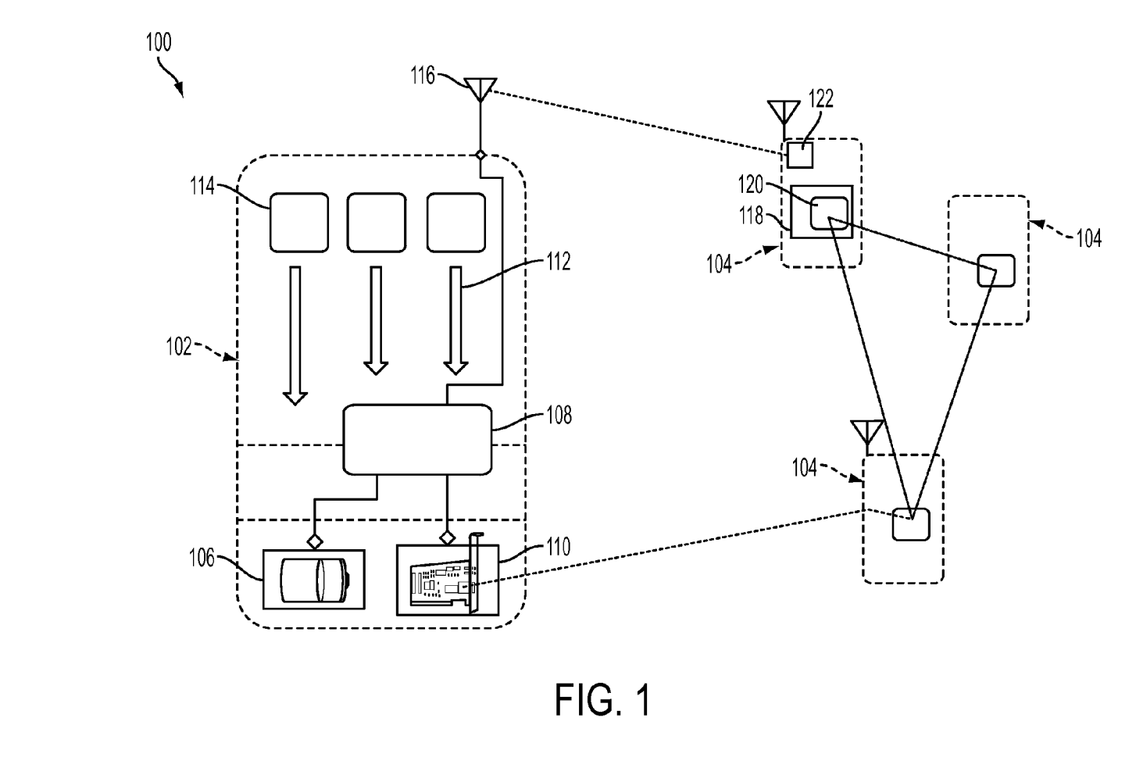
FIG. 1 is a block diagram illustrating a power system configured to manage battery energy of a mobile device is illustrated according to an exemplary embodiment.

Referring now to FIG. 1, a power system 100 configured to manage battery energy of a mobile device is illustrated according to an exemplary embodiment. By conserving the battery energy, the operation of the mobile device may be extended over an increased time period. The power system 100 includes a primary mobile device 102 and a plurality of peer devices 104. The primary mobile device 102 may include, but is not limited to, a cell phone, a laptop computer, a tablet computer, and a mobile media device. The peer devices 104 may include, but are not limited to, a cell phone, a personal computer, a laptop computer, a tablet computer, a mobile media device, a cloud server microcontroller to control operation of a cloud server, and an automotive microcontroller.

The primary mobile device 102 includes a power unit 106, an operating system (OS) 108, and a main communication module 110. The power unit 106 is configured to power the primary mobile device 102. The power unit 106 includes, for example, a rechargeable battery. When the power unit 106 is mains-connected, i.e., connected to a main power source such as a wall-mounted power outlet, the power unit 106 provides a constant and full power to the primary mobile device 102. When the power unit 106 is disconnected from the main power, however, the primary mobile device 102 is powered by a battery included in the power unit 106. As time proceeds, the energy level of the battery decreases until an insufficient amount of energy is available to operate the primary mobile device 102. The primary mobile device 102 must then shutdown. The reduction of battery energy, i.e., battery drainage, is affected by the operation of the primary mobile device 102. For example, the battery may drain faster when the primary mobile device 102 performs a high number of computations, or where the computations are carried out over a long duration of time. Accordingly, controlling the computations executed by the primary mobile device 102 may conserve battery energy and extend the operating time of the primary mobile device 102.

The OS 108 includes a collection of software and hardware components that operate the primary mobile device 102 and perform various computations for locally executing tasks 112 associated with applications 114 stored on memory of the primary mobile device 102 as understood by one of ordinary skill in the art. The tasks 112 may include raw data, i.e., non-computed data, which generates a desired object in response to computing the raw data and completing the task.

For example, the task 112 may include sending non-computed 2D map data, i.e., raw 2D data, to the OS 108 to undergo one or more computations. The OS 108 receives the raw 2D data and performs the computations on the 2D data to generate corresponding 3D data. Based on the 3D data, the OS 108 generates a 3D rendering of the 2D map data, and displays the 3D rendering to a user.

The OS 108 may also electrically communicate, i.e., transmit and/or receive data, with the power unit 106 and the main communication module 110. More specifically, the OS 108 may determine an energy level of the battery, and the remaining amount of energy and/or time left to power the primary mobile device 102 in response to communicating with the power unit 106. The OS 108 may further utilize the main communication module 110 to electrically receive and/or transmit data such as, for example, one or more tasks 112 associated with a respective application 114 stored on the primary mobile device 102. The main communication module 110 may include a wireless network module, such as Bluetooth module. The main communication module 110 may also be in electrical communication with a cellular antenna 116. The primary mobile device 102, therefore, may transmit and/or receive data according to a variety of wireless protocols including, but not limited to, Bluetooth, radio frequency (RF), Wi-Fi and cellular wireless standard protocols such as 3G, 4G, Long Term Evolution (LTE), etc.

The peer devices 104 may each include a peer OS 118 that operates the peer device 104 and performs various computations for executing tasks associated with applications stored on the peer device 104. The peer OS 118 may also include a peer process management module 120 to execute computations for completing tasks 112 received from the primary mobile device 102 via a peer communication module 122, as discussed in greater detail below.

Figure 2:
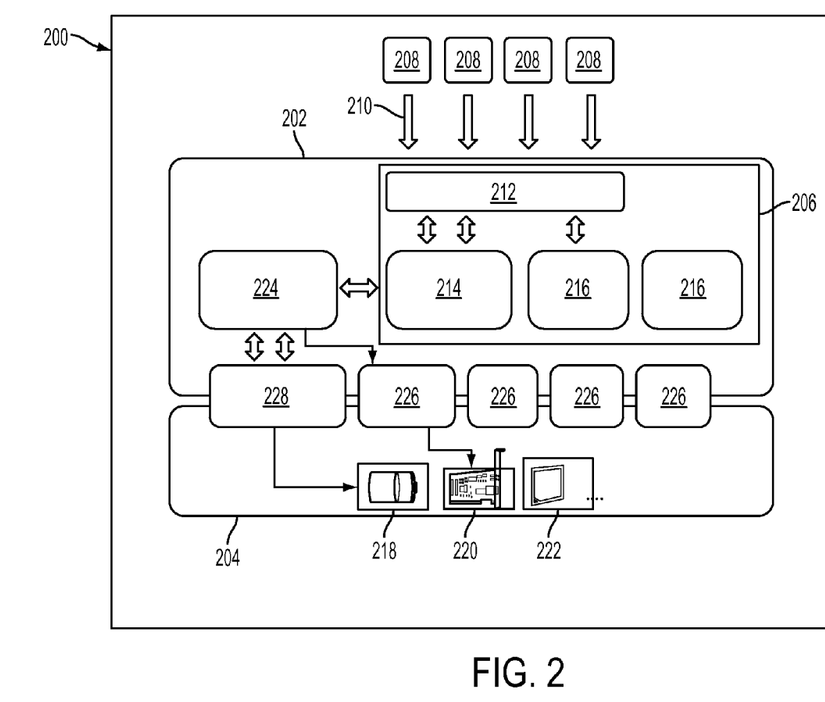
FIG. 2 is a block diagram illustrating a primary mobile device to offload a task of an application according to at least one embodiment.

Referring now to FIG. 2, a primary mobile device 200 is illustrated according to an embodiment of the disclosure. The primary mobile device 200 comprises an OS 202 and a hardware module 204. The OS 202 comprises a process management module 206. The primary process management module 206 is implemented as a microcontroller having memory that stores instructions for carrying out various methods and operations including, but not limited to, determining at least one application stored on the mobile device 200. In at least one embodiment, the process management module 200 includes one or more sub-modules to process and compute one or more tasks 208 corresponding to one or more applications 210 stored in memory of the primary mobile device 200. Applications 210 executed by the primary mobile device 200 may include software applications pre-stored on the primary mobile device 200 and/or may be included downloadable applications (Apps) which are downloaded from a server and stored on the primary mobile device 200.

In at least one embodiment illustrated in FIG. 2, the process management module 206 includes a process management interface 212, a task scheduler module 214, and a kernel modular 216. The process management interface 212 allows the process management module 206 to electrically communicate with the applications 208. Accordingly, one or more tasks 210 of an application 210 may be delivered to the process management module 206 via the process management interface 212. The task scheduler module 214 organizes one or more tasks 210 of an initiated application 210, and may prioritize the task 208 in preparation for local computation. The kernel module 216 provides an interface that communicates completed tasks and/or other application data to the hardware module 204 as understood by one of ordinary skill in the art.

The hardware module 204 may include a main power unit 218, a main communication module 220, and a memory module 222. The main power unit 218 may be connected to a power source and/or may include a battery. The main power unit 218 may operate in a mains-connected mode in response to being connected to the power supply, and a battery charging mode that supplies power using the battery when the main power unit 218 is not operating in the mains-connected mode. The battery may also be recharged when the power unit 218 is connected to the main power source and operating in the mains-connected mode.

The main communication module 220 is configured to electrically communicate, i.e., transmit and/or receive data, with a peer device that is different from the primary mobile device 200. For example, the main communication module 220 may transmit a task 208 from the primary mobile device 200 to one or more peer devices. In addition, the main communication module 220 may receive a completed task from the peer device. The at least one peer device may include, but is not limited to, a cell phone, a laptop computer, a tablet computer, a cloud server microcontroller for controlling operation of a cloud server and an automotive microcontroller. As mentioned above, the peer device includes a peer OS 118 and a peer process management module 120. The peer process management module 120 is configured to execute at least one computation that completes an offloaded task 208 and to transmit the completed task to the primary mobile device 200 in response to completing the at least one computation. In addition, the peer process management module 120 may determine communication patterns between the primary mobile device and the peer device to ensure that the peer device is free of loads and capable of computing an offloaded task. In at least one embodiment, the peer process management module may also include a peer assisted module similar to that of the primary mobile device.

The memory module 222 may store various software applications executable by the primary OS 202. The memory module 222 may also store the applications 208, which provide the tasks 210. The memory module 222 may also buffer raw data to be sent to a peer device to undergo further computations.

The primary mobile device 200 may further include a peer assisted module 224. In at least one embodiment, the peer assisted module 224 may be integrated with the OS 202, as further illustrated in FIG. 2. Integrating the peer assisted module 224 in the OS 202 may allow applications 208 running on the primary mobile device 200 to be unaware of an offloading feature and may reduce the need to re-program the OS 202 to utilize the offloading feature. Accordingly, peer mobile device 224 may detect data in the task 210 itself as eligible to be offloaded.

The peer assisted module 224 may electrically communicate with the process management module 206 and the hardware module 204. The peer assisted module 224 may receive tasks 210 of an application 210 from the task scheduler module 214. In addition, the peer assisted module 224 may communicate with the power unit 218 and main communication module 220 via a corresponding device driver 226. In at least one embodiment, an Advanced Configuration and Power Interface (ACPI) driver module 228 is provided to communicate the peer assisted module 224 with the main power unit 218. The ACPI driver module 228 is an industry standard module that efficiently controls energy consumption in computer devices. The ACPI driver module 228 may provide various types of power data including, but not limited to, whether the primary mobile device is connected to a main power source, remaining battery energy, and remaining operating time of the primary mobile device based on the amount of remaining battery, etc.

The peer assisted module 224 may determine an energy level of the power unit 218 based on data supplied from the ACPI driver module 228, and may determine a task 208 that is scheduled for execution based on information delivered by the task scheduler module 214. The peer assisted module 224 may determine whether to offload the scheduled task, i.e., transmit the scheduled task to a peer device, based on the energy level and/or the type of task that is scheduled. For example, if the energy level (E) of the power unit 218 is below an energy threshold ($E_{TH}$) the peer assisted module 224 may transmit the task 208 to the peer device. The energy threshold may be, for example, less than 25% of the total capable battery capacity. Since computations to complete the task 208 are executed by the peer device, the battery energy of the primary mobile device 200 is conserved and the primary mobile device 200 continues operating for a longer period of time.

The peer assisted module 224 may also determine a cost (C) that may be incurred by the primary mobile device 200 if the task is offloaded to the peer device. The cost may include, but is not limited to, an intensity of the task based on a number of computations needed to complete the task, and the duration of the computation time. The peer assisted module may compare the number of computations and/or the duration to a cost threshold value ($C_{TH}$). For example, a task 208 that requires a first number of computations, which is below or at the threshold value, may be determined as a low intensity task. Accordingly, the task 208 may be performed locally by the OS 202 of the primary mobile device 200. The cost may also be based on a logical equations such as:

$$C=\text{(transmission cost+cost of receipt+non-energy cost)}$$

A user may input a desired cost threshold value via the primary mobile device, which is used as determine whether the task is offloaded. In addition, a user may use an input unit of the primary mobile device to select which specific tasks are offloaded when an available peer device is detected.

However, if the task 208 requires a second number of computations that exceed the threshold value, the peer assisted module 224 may determine that the task is a high intensity task. Accordingly, the peer assisted module 224 may transmit the task 208 to an available peer device via the main communication module 220. The peer device may receive the task 208, execute the necessary computations, and transmit a completed task back to the primary mobile device 200. The primary mobile device 200 may then continue utilizing the completed task. As a result, the primary mobile device 200 may obtain a completed task, without using battery energy to execute the necessary computations required to generate the completed task, thereby prolonging the operating time of the primary mobile device 200. A similar operation may be applied with respect to the duration of the computations to determine whether to offload the task 208 to an available peer device.

The peer assisted module 224 of the primary mobile device 200 may determine whether one or peer devices are available to receive an offloaded task in a variety of ways. According to at least one embodiment, the peer assisted module 224 may perform a dynamic discovery process. More specifically, the peer assisted module 224 may output signal requesting whether a peer device is available to execute computations of an offloaded. The peer assisted module 224 may await an acknowledgment signal, and if an acknowledgment signal is received, may transmit the task 208 to the peer device. The necessary computations are carried out by the peer device, and a completed task is sent back to the primary mobile device 200.

In another embodiment, one or more peer devices that are capable of computing offloaded tasks may register with each other while they are available. When there is the need to execute an offloaded job, the peer assisted module 224 selects a peer device based on the local registry. Accordingly, the necessary computations are performed by the peer device and the completed task is returned to the primary mobile device 200. The peer devices may deregister themselves when they are no longer available. A peer device may determine it is unavailable if the peer device becomes located out of range from the primary mobile device 200. In addition, the peer device may determine it is unavailable to perform computations of an offloaded task if the peer device energy level falls below a predetermined energy level. Additionally, the peer device may determine it is unavailable if the load of the peer device exceeds a load threshold. A load applied on the peer device may include, but is not limited to, media playback, image processing, sound processing, wireless data communication, telephone call sessions, etc. The load may also include whether the peer device is in a user-friendly environment, for example, not located in a user's pocket that may cause excessive heat. In either embodiment described above, the peer assisted module 224 may determine to locally execute the necessary computations using the primary mobile device 200 in response to determining that no peer devices to compute an offloaded task exist.

In at least one embodiment, the primary mobile device and/or the peer device may determine a monetary value based on at least one of the amount of computations and the duration of the computations. For example, the peer device may determine a monetary cost based on the amount of computations and/or duration of computations required to complete the task. The monetary cost may be transmitted to the primary mobile device where, for example, a user may either accept or decline to pay the monetary cost. If the user declines the monetary cost, the task may be computed locally by the primary mobile device. If the user accepts to pay the monetary cost, the task may be transmitted to the peer device and computed accordingly. Calculations other than monetary costs may also be determined, such as credits and/or award points that may be exchanged for tangible objects or monetary payment.

Figure 3:
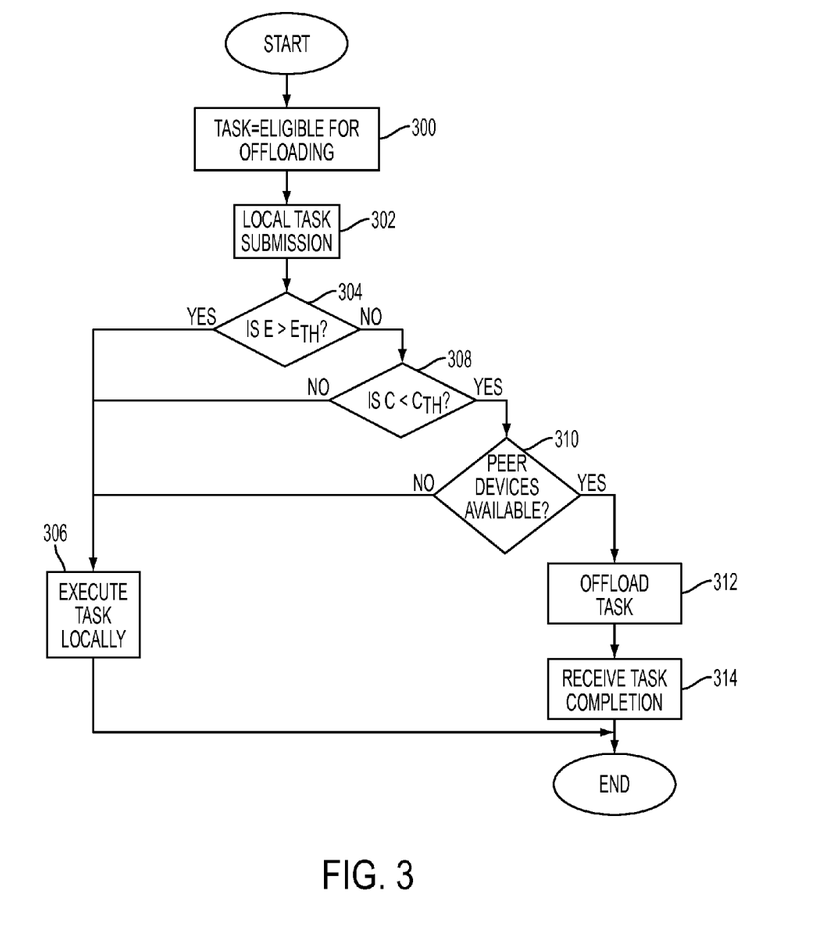
FIG. 3 is a flow diagram illustrating a method of managing energy of a primary mobile device according to at least one embodiment.

Referring to FIG. 3, a flow diagram illustrates a method of managing energy of a primary mobile device according to at least one embodiment. At operation 300, a task corresponding to an application executable by a primary mobile device is determined as eligible for offloading to a peer device to under computations that generated a completed task. In an embodiment, the task may include data detectable by the OS of the primary mobile device, which indicates that the task is eligible for offloading to a peer device. In another embodiment, the application itself may be aware that the task called for computation may be computed via a peer device. At operation 302, the task is prepared for computation by either the primary mobile device or a peer device. At operation 304, a determination is made as to whether an energy level (E) of the primary mobile device exceeds an energy threshold value $E_{TH}$. If E exceeds $E_{TH}$, the task is computed locally by the primary mobile device at operation 306.

If E is less than $E_{TH}$, however, a determination as to whether the cost (C) of offloading the task is less than a cost threshold ($C_{TH}$) is performed at operation 308. If C exceeds $C_{TH}$, the task is computed locally by the primary mobile device at operation 306. Otherwise, a determination as to whether any available peer devices are available to compute the task is performed at operation 310. If no peer devices are available, the task the task is computed locally by the primary mobile device at operation 306, and the method ends. However, if a peer device is available, the task is offloaded to the peer device at operation 314, and the method ends. During this time, the primary mobile device may conserve battery power while the peer device executes the necessary computations to complete the task. Thereafter, the primary mobile device may receive a completed task from the peer device. Since battery energy was not used to compute the task, the operation time of the primary mobile device may be extended.

Figure 4:
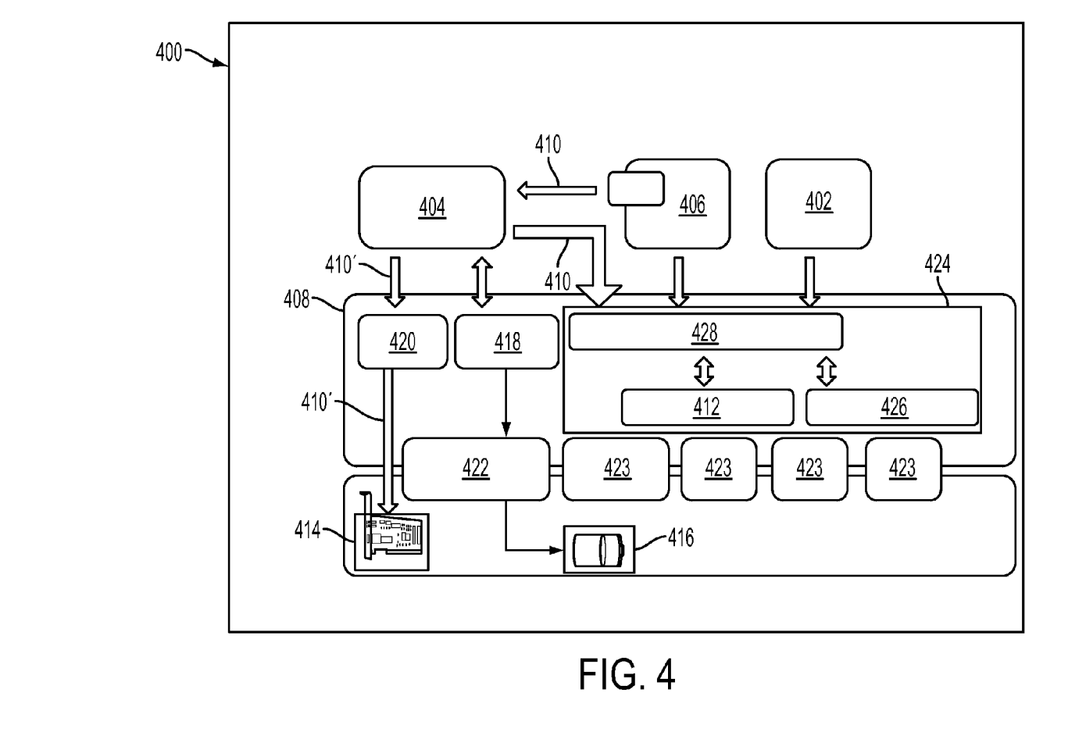
FIG. 4 is a block diagram illustrating a primary mobile device to offload a task of an application according to another embodiment.

Turning now to FIG. 4, a block diagram illustrates a primary mobile device 400 to offload a task of an application according to another embodiment. The primary mobile device 400 of FIG. 4 is similar to the primary mobile device 300 of FIG. 2 discussed in detail above. The interaction protocol described of the primary mobile device 400 is similar to the primary mobile device 300 of FIG. 3, and therefore will not be repeated. The primary mobile device 400 includes one or more applications 402 and a peer assisted module 404. In this case, however, at least one of the applications 402 is a peer assisted aware application 406 that is programmed to search for the peer assisted module 404 operating in the background of the primary mobile device 400. The peer assisted aware application 406 may be a downloadable App that is downloaded from a server to the primary mobile device 400. The peer assisted module 404 may also be a downloadable App stored on the primary mobile device 400.

As further illustrated in FIG. 4, the peer assisted module 404 is stored separately from the OS 408 of the primary mobile device 400, as opposed to being integrated with the OS 408 of the primary mobile device 400. The peer assisted aware application 406 is pre-programmed with data indicating which tasks 410 of the peer assisted aware application 406 are eligible for offloading to a peer device. A difference between the primary mobile device 400, as compared to the primary mobile device 300 illustrated in FIG. 3, is the modality through which tasks 410 are submitted for remote execution. The peer assisted aware application 406 will expose its own end point due to not being integrated with the OS 408 and the task scheduler module 412. That is, instead of placing the responsibility of identifying eligible tasks with a peer assisted module integrated with the OS (see FIG. 2), the peer assisted aware application 406 directly sends tasks 410 that are eligible for offloading to the peer assisted module 404 stored separately from the OS 408.

Since the peer assisted module 404 is stored separately from the OS 408, the primary mobile device 400 includes additional interface components to allow the peer assisted module 404 to electrically communicate with the main communication module 414 and the power unit 416. For example, the OS 408 of the primary mobile device 400 includes an ACPI interface 418 and a data communication socket interface 420. The ACPI interface 418 allows the peer assisted module 404 to communicate with the power unit 416 via an ACPI driver 422 to determine an energy level of the primary mobile device 400. The data communication socket interface 420 may include, for example, a network socket that allows the peer assisted module 404 to communicate with the main communication module 414 such that a task 410 may be transmitted to a peer device. The data communication socket interface 420 may also allow the peer assisted module 404 to electrically communicate with other software and/or hardware drivers 423.

When the peer assisted module 404 determines that a task 410 should be offloaded to a peer device, the task 410' may be transmitted to the peer device via the main communication module 414. However, if the peer assisted module 404 determines, for example, that no available peer devices exist or the cost (C) of offloading the task 410 exceeds a cost threshold ($C_{TH}$), the peer assisted module 404 may output the task 410 to the process management module 424. Accordingly, the task 410 may be transmitted to the task scheduler module 412, kernel module 426, etc., via the process management interface 428 such that the task 410 is computed locally by the OS 408 of the primary mobile device 400.

Figure 5:
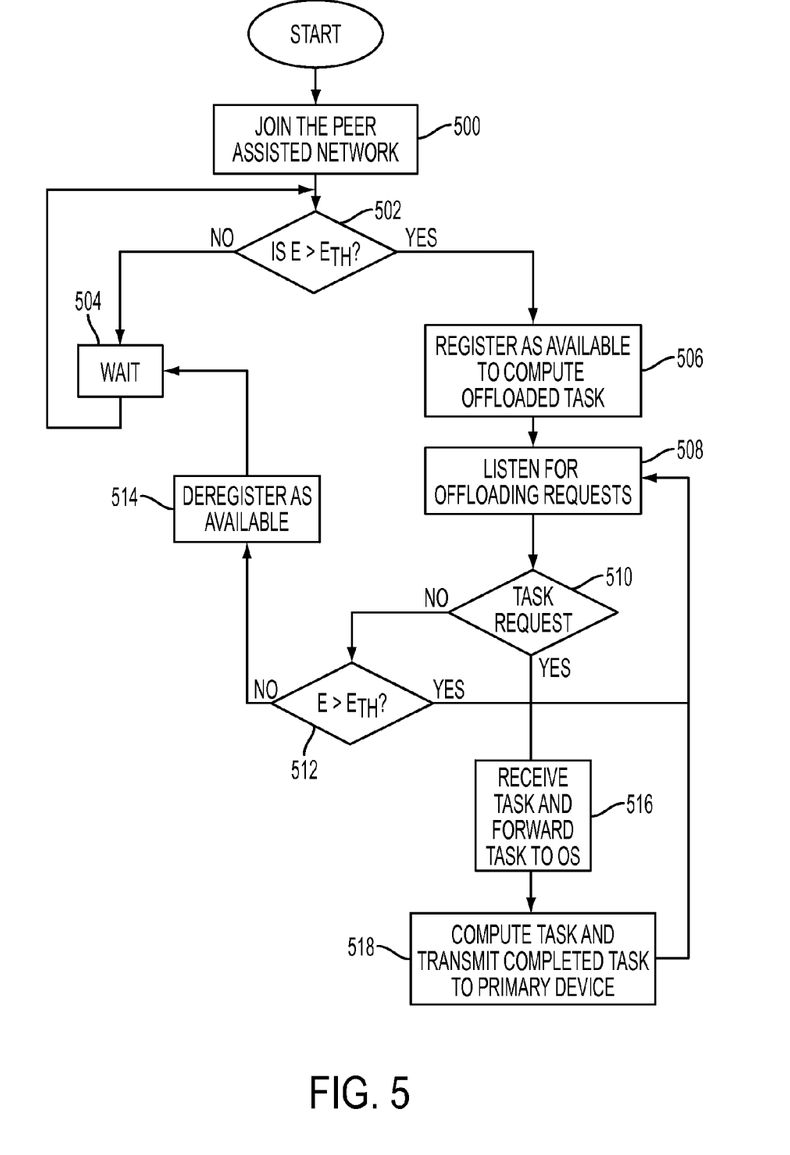
FIG. 5 is a flow diagram illustrating a method of managing energy of a primary mobile device according to another embodiment.

Referring to FIG. 5, a flow diagram illustrates a method of managing energy of a primary mobile device according to another embodiment. At operation 500, the peer device joins a network in communication with a primary mobile device capable of offloading one or more tasks. The tasks correspond to an application stored on the primary mobile device as discussed in detail above. At operation 502, a determination is made as to whether the peer device is sufficiently powered to execute computations necessary to complete a task received from the primary device. Energy determination may be based on, for example, a remaining battery energy of the peer device, or whether the peer device is mains-connected, i.e., connected to a power source. If P does not exceed ETH, then the method proceeds to operation 504 for a predetermined time period before returning operation 502 to determine the energy of the peer device.

However, if P exceeds ETH, the peer device registers itself as an available peer device at operation 506. Accordingly, the primary mobile device may determine that the peer device is available to execute one or more computations necessary to complete a task transmitted from the primary mobile device. At operation 508, the peer device waits for an offload request from the primary mobile device. If no request is received after a predetermined amount of time at operation 510, the peer device may determine whether a sufficient amount of energy still remains to execute one or more computations for completing a task at operation 512. If there is an insufficient amount of energy, the peer device deregisters from the network at operation 514, and return to operation 502 to determine the energy level.

Turning to operation 510, if an offload request is received, the task may be received by the peer device at operation 516 and forwarded to the peer device OS. The OS performs one or more computations to generate a completed task and transmits the completed task back to the primary mobile device at operation 518. Thereafter, the primary mobile device may continue listening for requests from the primary mobile device to perform computations on an offloaded task.

As described herein, a system and/or server, for example, the system 100, may be described in the general context of computer system executable instructions, such as program modules, being executed by an electronic computer system. Generally, program modules may include routines, programs, objects, components, logic, data structures, and so on that perform particular tasks or implement particular abstract data types. In addition, a computer system and/or server may be practiced in distributed cloud computing environments where tasks are performed by remote processing devices that are linked through a communications network. In a distributed cloud computing environment, program modules may be located in both local and remote computer system storage media including memory storage devices.

As will be further described above, memory may include at least one program product having a set (e.g., at least one) of program modules that are configured to carry out the functions of embodiments of the invention.

Furthermore, Programs, functions, applications and tasks may be implemented and executed by one or more having a set (at least one) of program modules. Program modules may include memory that stores, for example, an operating system, one or more application programs, other program modules, and program data. Each of the operating system, one or more application programs, other program modules, and program data or some combination thereof, may include an implementation of a networking environment. Accordingly, the program modules described herein may carry out the functions, applications, tasks, and/or methodologies of the various embodiments described herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flow diagrams depicted herein are just one example. There may be many variations to this diagram or operations described therein without departing from the spirit of the claims. For instance, the operations may be performed in a differing order. In addition, operations may be added, deleted or modified. All of these variations are considered a part of the claimed inventive teachings.

While various embodiments to the invention have been described, it will be understood that those skilled in the art, both now and in the future, may make various modifications which fall within the scope of the claims which follow. These claims should be construed to maintain the proper protection for the invention first described.

What is claimed is:

1. A method of managing battery energy of a mobile device, comprising:
    detecting an execution of at least one software application stored on the mobile device;
    determining a task of the software application, the task being completed in response to executing at least one computation;
    determining a level of energy available to the mobile device;
    determining a cost value based on an amount of computations for completing the task and a duration of the at least one computation;
    determining a monetary value based on at least one of the amount of computations and the duration of the at least one computation;
    transmitting the task from the mobile device to a peer device when the cost value is below a cost threshold value, the monetary value is below a monetary threshold value, and the level of energy available to the mobile device is below a predetermined threshold level;
    executing the at least one computation via the peer device to generate a completed task; and
    transmitting the completed task from the peer device to the mobile device.

2. The method of claim 1, further comprising executing via a primary mobile device the task computed by the peer device task.

3. The method of claim 2, further comprising outputting a request to offload the task to the at least one peer device.

4. The method of claim 3, further comprising detecting via the at least one peer device the request and receiving the task at the at least one peer device in response to outputting an accept command.

5. The method of claim 4, further comprising locally executing the task via the mobile device in response to at least one of the cost value exceeds a cost threshold and a failure to receive the accept command.

6. The method of claim 5, further comprising receiving via the mobile device an input from the user indicating that at least one application includes a task to be communicated to the peer device for computation.

7. The method of claim 6, further comprising integrating a peer assisted module in an operating system of the primary mobile device, the peer assisted module configured to determine tasks that are eligible for offloading to a peer device.

8. The method of claim 6, further comprising implementing a peer assisted module as a peer assisted application module that is stored separately from an operating system of the primary mobile device, the peer assisted module configured to determine tasks that are eligible for offloading to a peer device.

9. A method of offloading at least one task of an application to reduce energy consumption of a mobile device, the method comprising:
generating power to operate the mobile device;
electrically communicating the mobile device with a peer device that is different from the mobile device;
determining a remaining amount of the energy based on an amount of computations for completing the at least one task and a duration;
determining a cost value based on an amount of computations for completing the task and a duration of the at least one computation;
determining a monetary value based on at least one of the amount of computations and the duration;
transmitting the at least one task to the peer device in response to determining the remaining amount of energy is below an energy threshold, the cost value is below a cost threshold value, and the monetary value is below a monetary threshold value.

10. The method of claim 9, further comprising receiving a completed task from the at least one peer device, the peer device transmitting the completed task to the mobile device in response to executing at least one computation of the task.

11. The method of claim 10, further comprising determining a cost value based on a number of computations for completing the task and a duration of the computations, and transmitting the task to the peer device based on at least one of the remaining amount of energy and the cost value.

12. The method of claim 11, further comprising outputting a request to transmit a task associated with an application stored on a primary mobile device to an available peer device to execute at least one computation that completes the task.

13. The method device of claim 12, further comprising locally computing the task at the mobile device in response to at least one of the cost value exceeding the cost threshold and a failure to identify an available peer device.

14. The method device of claim 13, wherein the mobile device includes at least a cell phone, a laptop computer, a tablet computer, and a mobile media device.

15. The method of claim 14, further comprising integrating a peer assisted module with an operating system of the primary mobile device, the peer assisted module configured to determine tasks that are eligible for offloading to a peer device.

16. The method of claim 14, further comprising downloading a peer assisted module from a server and storing the peer assisted module separately from an operating system of the primary mobile device, the peer assisted module configured to determine tasks that are eligible for offloading to a peer device.

17. A method of executing at least one task using a peer device to reduce energy consumption of a primary mobile device, the method comprising:
determining a cost value based on an amount of computations to complete the task and a duration of the at least one computation;
determining a monetary value based on at least one of a duration of the at least one computation and an amount of computations performed;
electrically communicating the peer device with the primary mobile device that is different from the peer device;
transmitting the at least one task to the peer device from the primary mobile device when the cost value is below a cost threshold value, the monetary value is below a monetary threshold value, and level of energy available to the mobile device is below a predetermined threshold level;
executing at least one computation via the peer device to complete the at least one task; and
transmitting a completed task from the peer device to the primary mobile device in response to completing the at least one computation.

18. The method of claim 17, further comprising registering the peer device as an available peer device and determining whether the primary mobile device requests an available peer device to execute the at least one task in response to the registering.

19. The method of claim 18, further comprising deregistering the peer device in response to determining an energy level of the peer device is below an energy level threshold.

20. The method of claim 19, further comprising deregistering the peer device in response to determining a load of a process management module exceeds a load threshold.

21. The method of claim 20, wherein the peer device includes at least a cell phone, a laptop computer, a tablet computer, a mobile media device, a cloud server microcontroller to control operation of a cloud server, and an automotive microcontroller.

* * * * *